United States Patent [19]

Orton et al.

[11] Patent Number: 4,595,398
[45] Date of Patent: Jun. 17, 1986

[54] PROPELLANT ACQUISITION DEVICE

[75] Inventors: George F. Orton, St. Louis County, Mo.; Thomas F. Schweickert, Madison County, Ill.

[73] Assignee: McDonnell Douglas Corporation, St. Louis, Mo.

[21] Appl. No.: 612,085

[22] Filed: May 21, 1984

[51] Int. Cl.⁴ .............................................. B01D 53/22
[52] U.S. Cl. ...................................................... 55/182
[58] Field of Search ................................. 55/159, 182

[56] References Cited

U.S. PATENT DOCUMENTS

| | | | |
|---|---|---|---|
| 3,486,302 | 12/1969 | Paynter | 55/159 |
| 3,492,793 | 2/1970 | Bhuta et al. | 55/159 |
| 3,854,905 | 12/1974 | Balzer et al. | 55/159 |
| 3,933,448 | 1/1976 | DiPeri | 55/159 |
| 4,272,257 | 6/1981 | Ellion et al. | 55/159 X |

Primary Examiner—Charles Hart
Attorney, Agent, or Firm—Gravely, Lieder & Woodruff

[57] ABSTRACT

A propellant acquisition device for a maneuvering engine in a satellite vehicle in which a propellant tank or container is provided with a propellant trap located internally of the tank adjacent a tank outlet to the maneuvering engine. The trap device is positioned to receive propellant and become refilled upon maneuvering engine use which causes propellant in the tank to migrate to the trap device and overcome the on-orbit drag on the propellant which causes it to migrate away from the trap device.

11 Claims, 10 Drawing Figures

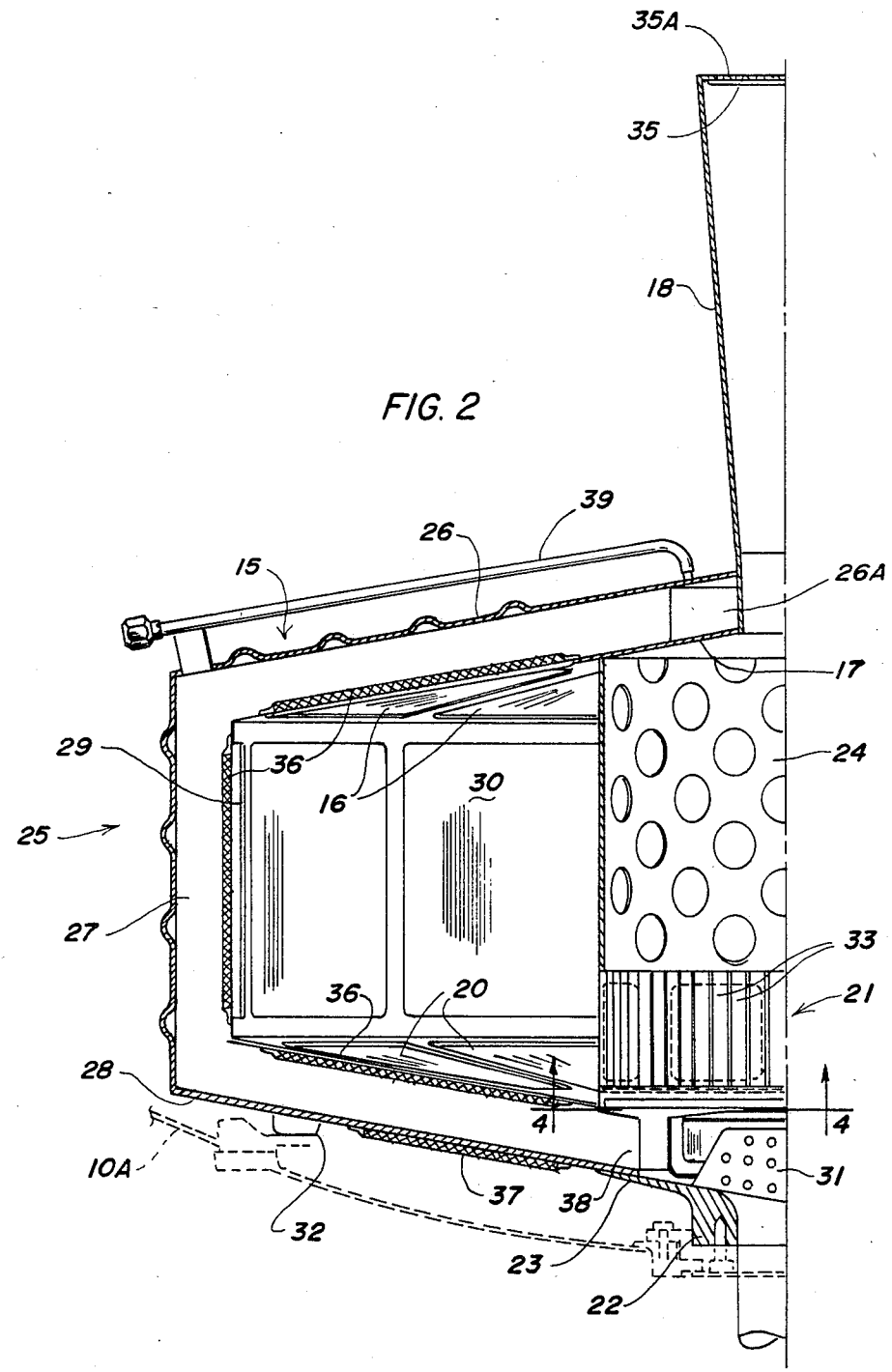

PROPELLANT ACQUISITION DEVICE

BACKGROUND OF THE INVENTION

1. Field of the Invention

This invention is directed to an improved device for supplying vapor-free propellant in a reliable manner for spacecraft maneuvering propulsion systems.

2. Description of the Prior Art

Current propellant acquisition provisions as based on positive expulsion devices are found to be impractical and unreliable in large propellant tanks. Also, current provisions based on propellant settling with small thrusters are neither efficient nor compatible with the need for rapid response.

It is known that surface tension screened gallery devices, such as those employed in the shuttle orbital maneuvering or reaction control subsystems, are high in cost and require complex interfaces with the tank shell. Also, surface tension vane devices, such as those employed in current satellites, are regarded as inappropriate for large tanks because of long refill times during orbital coast which yield response times too slow to be satisfactory.

SUMMARY OF THE INVENTION

The present propellant acquisition device embodies a surface tension, refillable trap device in the propellant tank, which overcomes the problems in the prior devices and provides a compact, low cost, highly responsive propellant delivery system for multiple, zero-gravity (g) engine starts.

The trap device of this invention is in the form of a screened body assembly which retains liquid propellant at the tank outlet for zero-g engine startup when it is desired to perform a maneuver in space. In the engine startup phase, the liquid propellant already in the body of the device supplies the engine until the bulk propellant in the tank settles over the device as a result of the thrust buildup. Then, as the engine burn progresses, the body of the device undergoes a refill cycle as a result of hydrostatic pressure forces.

The objects of the present invention are to provide a compact propellant acquisition device capable of a large number of zero-g engine startups, and to install the device in the propellant tank in a manner that minimizes the interfaces between the tank and acquisition device.

Other objects of the present invention are to incorporate in the propellant acquisition device surge suppression means to reduce inertial pressure drop across propellant flow channel screens at engine startup, to rely upon pleated screen constructions to increase structural rigidity, to minimize propellant flow pressure drop, to reduce refill times of the trap device, and to provide a vent stack to facilitate the expulsion of entrapped gases during the refill process.

BRIEF DESCRIPTION OF THE DRAWINGS

The propellant acquisition device is illustrated in the accompanying drawing, wherein:

FIG. 2 is a half sectional elevational view of the device of FIG. 1 taken along line 2—2 thereof;

DETAILED DESCRIPTION OF THE INVENTION

Figures 7A, 7B, 7C, 7D:
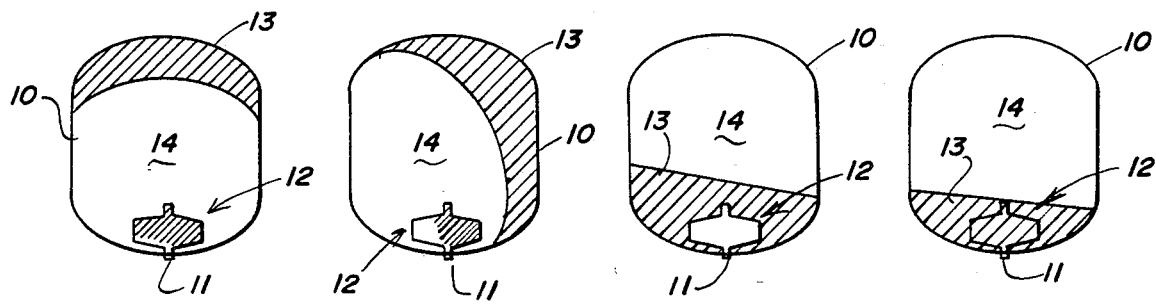
FIGS. 7A to 7D are schematic views of a propellant tank and the device of this invention to illustrate certain reactions of the liquid propellant during satellite coast and during engine firings.

Attention is first directed to FIGS. 7A to 7D for an understanding of the utility of the present propellant acquisition device for supplying required propellant in liquid form to a maneuvering engine in a satellite, orbit transfer vehicle or the like. FIG. 7A shows schematically a propellant tank 10 having an outlet 11 at the location of the present device 12. The shaded area 13 represents the liquid propellant which may be monomethyl hydrazine, nitrogen tetroxide, or some equivalent propellant. The open area 14 represents pressurized gas or vapor which is released from the propellant. The tank 10 is typically pressurized with helium gas to meet rocket engine inlet pressure demands. After the satellite has reached orbit and is in a coast phase, the on-orbit drag causes deceleration to occur which causes the liquid propellant 13 to migrate or otherwise flow into the end of tank 10 opposite from the outlet 11. However, before launch, the propellant 13 in the tank 10 has completely filled the device 12, whereupon at the first operation of the rocket type maneuvering engine (not necessary to illustrate) the body of liquid propellant 13 will respond to the acceleration thrust and migrate, as shown in FIG. 7B, toward the device 12. Continued engine thrust will cause the propellant 13 to immerse the device 12, as seen in FIG. 7C, and refill it. The refilling process is completed as seen in FIG. 7D. The elapse time of the sequence from FIGS. 7A to 7C or 7D changes, depends on the acceleration response of the satellite or orbit transfer vehicle. If the acceleration response is of the order of 0.2 g's, the refill of the device 12 may take approximately 6 to 8 seconds. If the acceleration response is in the range of 0.8 g's, the refill of the device can be greatly accelerated to about 3 to 4 seconds. It can be appreciated from the above that the present device 12 refills quite rapidly. If the maneuver is of sufficient duration, the device 12 is fully charged and ready to supply propellant instantaneously at the next engine firing command.

Figure 1:
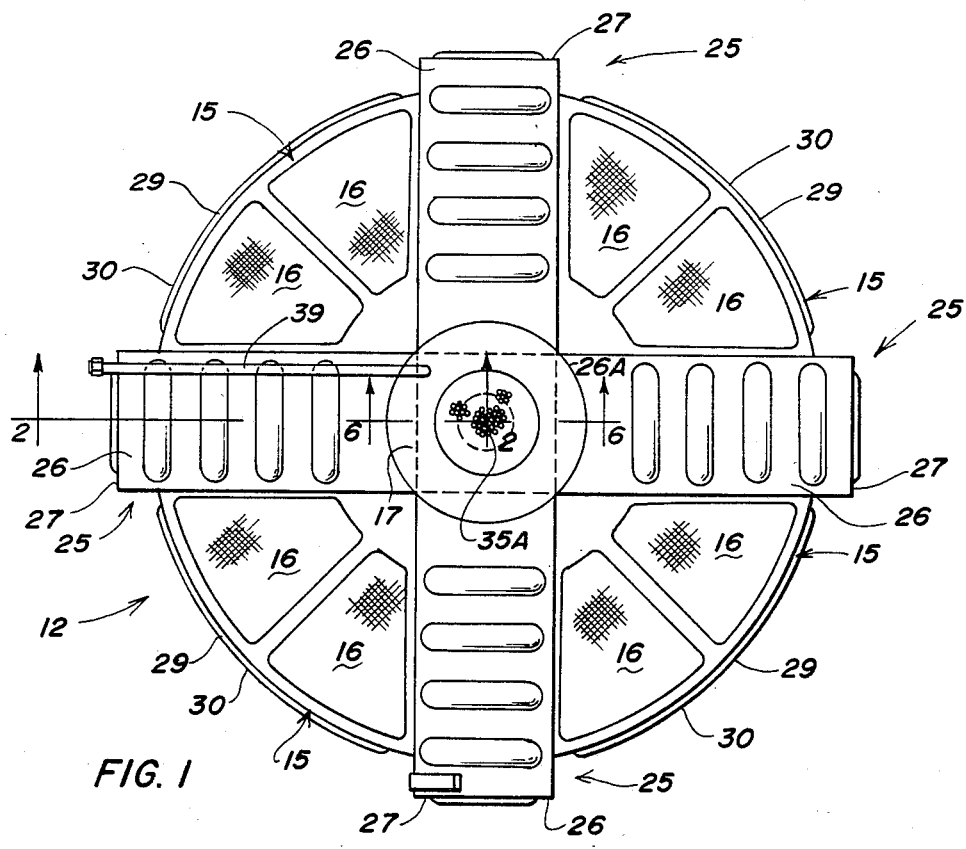
FIG. 1 is a top plan view of the propellant acquisition device to show the general assembly features.
Figure 3:
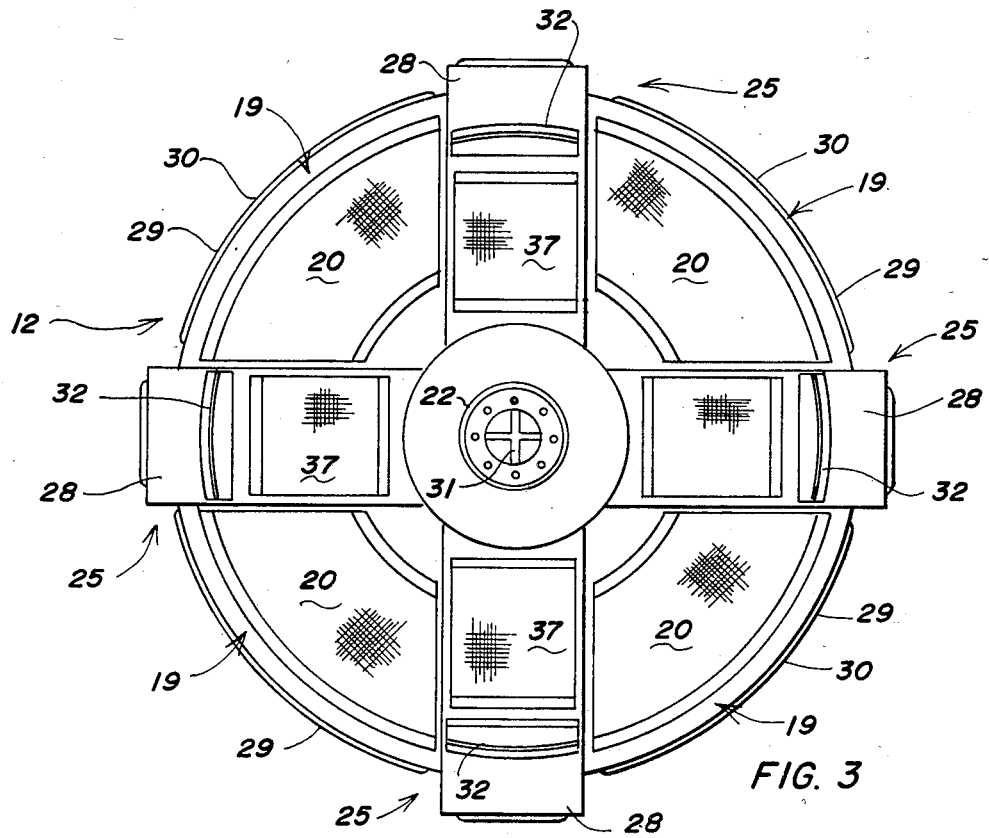
FIG. 3 is a view looking up from the bottom of the general assembly.
Figure 4:
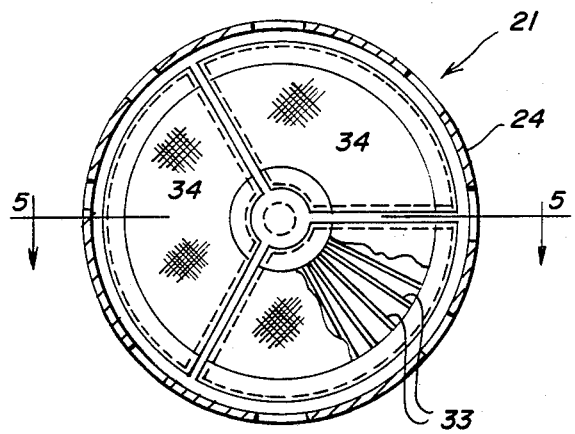
FIG. 4 is a fragmentary view of a detail of the propellant surge suppressor as seen along line 4—4 in FIG. 2.
Figure 5:
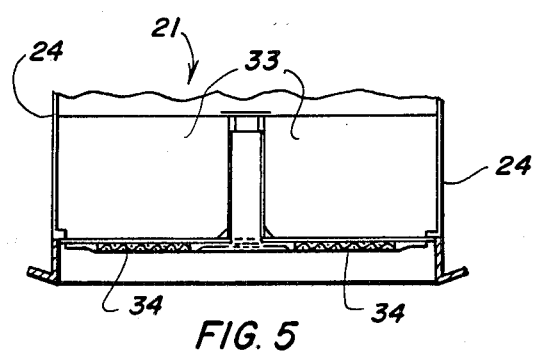
FIG. 5 is a sectional view taken along line 5—5 of FIG. 4.

The liquid propellant acquisition device 12 is seen in greater detail in FIGS. 1, 2 and 3. The major components comprise a top wall frame 15 having four pie-shaped sections, each one supporting screens 16. The frames 15 are joined in the center by a hub plate 17 which is adapted to support an upstanding and tapering vent stack 18 (FIG. 2). The frame sections 15 are shaped to a shallow cone. Another major component is the bottom wall frame 19 having four pie-shaped sections (FIG. 3) which support screens 20. The central area of the bottom wall frame 19 is occupied by a cylindrical surge suppressor assembly 21 (FIG. 2), the details of which are seen in FIGS. 4 and 5. Below the assembly 21 is the outlet body 22 having a flange 23 to which a perforated center support 24 is attached. The bottom wall sections 19 are shaped to a shallow cone and attached to the perforated center support 24 opposite the top wall frame assembly. The cylindrical and perforated wall center support tube 24 extends from the outlet flange 23 to the top wall plate 17 of frame sections 15. The tube 24 retains the top and bottom wall sections from collapsing under loads imposed by propellant settling.

The top and bottom frame sections 15 and 19 are held in assembly by four propellant flow channels 25, each of which includes a top portion 26, a side wall portion 27 and a bottom portion 28. These portions function as structural ribs set at 90° spacing so that the pie-shaped sections 15 and 19 are exposed to the propellant in tank 10. The top portions 26 of the flow channels open into an annular manifold 26A that surrounds the base of the vent stack 18. The pie-shaped sections 15 and 19 are joined by vertical frame sections 29 which support screens 30 which extend circumferentially between the side wall portions 27 of the flow channels 25 so that the interior of the device 12 is enclosed in major part by screens and in a remainder by the flow channels 25.

The outlet 22 in the bottom frame sections 19 is provided with a cruciform baffle assembly 31 in which there are perforations to allow flow but to prevent the formation of a vortex in the throat of the outlet 22. Also there are suitable support fittings 32 between the bottom portions 28 of the flow channels 25 and the adjacent wall 10A of the tank 10 so that the assembled device 12 can be carried inside the tank and spaced from the bottom wall 10A to allow liquid propellant to completely immerse it. This provides for maximum exposure to the propellant which considerably shortens the time of refilling and enables propellants 13 to enter screens 37 for communication with the outlet 22 to achieve high propellant expulsion efficiency.

It is seen in FIGS. 2 and 4 and 5 that the cylindrical surge suppressor assembly 21 is contained inside the support tube 24 and consists of rectangular sheet metal plates, or fins 33 and bottom gas arrestor screens 34. The purpose of the surge suppressor assembly is to contain a small amount of liquid propellant adjacent to the outlet and supply it to the outlet during the engine start transient, thus reducing propellant flow acceleration and associated inertial pressure drop in the flow channel assemblies 25.

Figure 6:
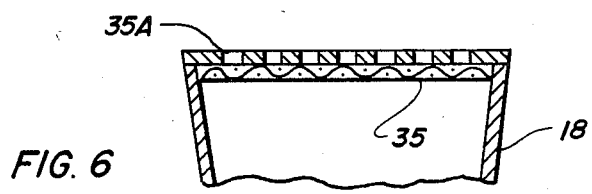
FIG. 6 is a view taken along line 6—6 in FIG. 1 showing the screened vent plate.

During the engine burn, after the bulk propellant is settled, the device refills by hydrostatic pressure forces by allowing gas or vapor to escape through the perforated cylindrical support 24 and through the expanding conic vent stack 18 into the tank 10. In FIG. 6 it can be seen that the expanded end of the conic vent stack 18 carries a screen 35 and perforated plate 35A to allow the escape of the gas or vapor.

FIG. 2 shows a side view of a typical flow channel 25 with its sections 26, 27 and 28 provided with screens 36 set into the inner walls to be presented to the interior of the device 12. A further screen 37 is set into the outer wall of the channel section 28 to allow for propellant flow into the flow channel 25 from the bottom of the tank 10. It is to be understood that the end 38 of the channel section 28 is open to allow the propellant to flow directly into the outlet 22 where it will be intercepted by the anti-vortex means 31 to smoothe out the flow leaving the outlet throat. Propellant enters the flow channels 25 from the interior space through the inside screens 36.

The device 12, shown in FIG. 1, uses a screened assembly to retain propellant at the tank outlet for zero-g engine startup. At engine startup, propellant is fed from the device 12 through flow channels 25 to the tank outlet. As engine thrust builds up, the bulk propellant reorients over the tank outlet, and the device 12 refills by hydrostatic pressure. During refill, gas inside the device vents through the screen-covered vent stack to the tank 10. The refill rate determines the minimum engine burn time required to prepare the device for the next engine start.

The device 12 is sized to provide propellant flow to the engines during the start transient and propellant settling interval. Volume allowances are provided for a false start, incomplete refill from a previous burn, and propellant residuals within the device. The start device screens are pleated to provide maximum flow area, and thus minimum refill time. The pleated construction also makes the screens more rigid, to withstand slosh loads and collapse pressures during outflow. The start device screen mesh, 325×2300 twilled dutch double weave (TDDW), provides liquid containment under normal gravity test conditions. This screen mesh also possesses excellent wicking characteristics that allow the screens to remain wetted with partial propellant loads. The material for the TDDW screens may be obtained from Brunswick Corporation, Technetics Division Wintec, or other supplier.

Four flow channels 25 supply liquid propellant from the start device to the tank outlet. Propellant from the trap enters the flow channels through screen windows 36, which are pleated to maximize the flow area and reduce the screen pressure drop during flow. Pleated screen windows 37 are also provided on the lower surface of each flow channel 28 to maximize propellant expulsion efficiency by drawing propellant from the lowest point in the tank. The flow channels are sized to minimize dynamic pressure losses in the channel. The screen mesh size (325×2300 TDDW) provides maximum retention margins during outflow. A vent tube 39 (FIG. 2) at the top of the flow channel upper manifold is used during propellant loading to ensure that the flow channels are filled completely. This vent tube is also used for bubble point verification of the flow channel screens.

It can be appreciated from the foregoing description that the propellant acquisition device is constructed to admit and trap the propellant medium in a space enclosed by liquid permeable screen means where the liquid portion is directed to an outlet while the vapor portion is given an opportunity to escape. The liquid portion of the propellant is provided with flow channels which promote the easy movement of the liquid toward the outlet substantially free of vapor. The device is disposed in a suitable tank or cell which is pressurized by helium gas to provide a positive delivery of the liquid propellant. However, the delivery must be controlled to avoid surges, and the vapor must be vented during refilling. The venting is accomplished by giving the vent a tapering configuration to offer resistance to reversing its direction of escape back to the tank or cell.

The device 12 is unique in that it is formed with liquid permeable screen surfaces which minimize the refill time and concurrently provide structural support to resist collapse under loads of the pressurized propellant in the tank or cell. Further resistance to collapse is provided by perforated support means positioned inside the device 12. The device includes a flow surge suppressor adjacent the outlet to reduce flow acceleration pressure drop during start transient. Moreover, it is to be understood that the vent means allows vapor to be vented by hydrostatic pressure when propellant is settled, and its length and provision of the screen 35 (FIG. 6) ensures complete refill of the device under substantially minimum spacecraft maneuvering acceleration levels. The vent screen 35 also provides for propellant containment during spacecraft adverse attitude control maneuvers.

It is understood that variations may be made in the present form of the acquisition device without departing from the teaching of the embodiment as set forth herein.

What is claimed is:

1. A propellant supply container having an outlet to which is connected a propellant acquisition device adapted for supplying a maneuvering thrust engine of a space vehicle with propellant from the supply container, said acquisition device being located in the container in the region of the outlet but not elsewhere and comprising:
   (a) a propellant trap device mounted in the container adjacent the outlet and having liquid permeable surfaces enclosing an internal space separate from the supply container, with the surfaces being capable of passing the liquid propellant and retaining the liquid propellant in the internal space, all for collecting the propellant in the internal space, the permeable surfaces including a first end surface at one end of the internal space, a second end surface spaced from the first end surface and being at the other end of the internal space, and a peripheral surface extended generally between the end surfaces and generally around the internal space;
   (b) a liquid propellant outlet opening located outwardly from the internal space at the second end surface of said trap device and connected to the supply container outlet;
   (c) propellant vapor escape means opening from the internal space at the first end surface of said trap device and into the supply container in a direction away from said outlet opening; and
   (d) liquid propellant flow channels extending about said internal space of said trap device at spaced intervals, with each channel having a portion along the first end surface, another portion along the peripheral surface and still another along the second end surface, the three portions for each channel being in communication with each other and further being in communication with such internal space through a liquid permeable surface that is likewise capable of passing the liquid propellant, said portions of the flow channels that are located along the second end surface having ends opening toward and into said outlet opening for directing liquid propellant substantially directly into said outlet opening.

2. The propellant acquisition device set forth in claim 1 wherein liquid propellant flow surge suppressor means is disposed adjacent said outlet opening.

3. The propellant acquisition device set forth in claim 1 wherein said liquid permeable surface is defined by a series of screens.

4. The propellant acquisition device set forth in claim 1 wherein said liquid permeable surface of said trap device includes spaced frames and liquid permeable screens carried by said frames, and means in said internal space supporting said spaced frames against collapse inwardly toward each other.

5. The propellant acquisition device set forth in claim 1 wherein said liquid permeable surface is twilled dutch double weave mesh having wicking characteristics adapted for retaining liquid propellant in said internal space.

6. The propellant acquisition device set forth in claim 1 wherein said propellant vapor escape means is divergently tapered away from said internal space for providing substantially oneway unrestricted venting of pressurant gas or propellant vapor.

7. The propellant acquisition device set forth in claim 1 wherein said liquid propellant flow channels support said liquid permeable surfaces.

8. In a propellant holding container for a vaporizable liquid propellant under a pressurant to be discharged through an outlet connected to a liquid propellant using engine, the improvement comprising:
   (a) a liquid propellant acquisition trap positioned in the container at the container outlet but not elsewhere in the container, said trap presenting a liquid propellant permeable body to the interior of the container to enclose a space, the permeable body allowing the liquid propellant to pass through it and into the space and retaining the propellant in the space, the trap further having means for connecting the space enclosed by the body with the container outlet so that liquid propellant will flow to the container outlet;
   (b) liquid propellant surge suppression means in the space enclosed by the body of said trap in position relate to the container outlet to reduce inertial pressure drop across the trap between the container outlet and the propellant in the container, the surge suppression means including a tubular housing adjacent to and in communication with the container outlet for holding a small amount of liquid propellant and fins arranged in the housing, the tubular housing extending away from the container outlet and beyond the fins where it is provided with perforations which open into the space enclosed by the permeable body;
   (c) vent means at said trap for venting back to the container vapor present in said trap during acquisition by said trap of liquid propellant, the vent means including a stack having one end opening into the tubular housing that is within the space enclosed by the permeable body and another end opening into the interior of the container beyond the permeable body of the trap.

9. The improvement set forth in claim 8 wherein said liquid propellant permeable body includes an array of plate means and a propellant vapor arresting screen for presenting liquid propellant adjacent the outlet.

10. The improvement set forth in claim 8 wherein said trap includes baffle means disposed at the outlet for preventing the formation of a vortex in the outlet.

11. The improvement set forth in claim 8 wherein said trap body is composed of a plurality of liquid permeable walls presented to the interior of the propellant holding container so the trap body is bathed in propellant.

* * * * *